(12) United States Patent
Bäumer (10) Patent No.: US 9,816,583 B2
(45) Date of Patent: Nov. 14, 2017

(54) FLYWHEEL ENERGY STORE (71) Applicant: Thomas Bäumer, Hückelhoven (DE)

(72) Inventor: Thomas Bäumer, Hückelhoven (DE)

(73) Assignee: Enrichment Technology Deutschland GmbH (DE)

( * ) Notice: Subject to any disclaimer, the term of this patent is extended or adjusted under 35 U.S.C. 154(b) by 180 days.

(21) Appl. No.: 14/419,399

(22) PCT Filed: Aug. 13, 2013

(86) PCT No.: PCT/EP2013/066884
§ 371 (c)(1),
(2) Date: Mar. 19, 2015

(87) PCT Pub. No.: WO2014/026970
PCT Pub. Date: Feb. 20, 2014

(65) Prior Publication Data
US 2015/0211599 A1    Jul. 30, 2015

(30) Foreign Application Priority Data

Aug. 14, 2012 (EP) ..................................... 12180368

(51) Int. Cl.
| F16F 15/30 | (2006.01) |
| F16F 15/305 | (2006.01) |
| F16F 15/315 | (2006.01) |
| F16F 1/366 | (2006.01) |
| F16F 1/48 | (2006.01) |

(52) U.S. Cl.
CPC ........ *F16F 15/305* (2013.01); *F16F 15/3153* (2013.01); *F16F 1/366* (2013.01); *F16F 1/48* (2013.01); *F16F 2234/02* (2013.01); *Y02E 60/16* (2013.01); *Y10T 74/212* (2015.01)

(58) Field of Classification Search
CPC ................. F16F 15/305; F16F 15/3153; F16F 15/13423; F16F 15/137; F16F 15/30; F16F 1/366; F16F 1/48; F16F 2234/02; Y10T 74/212; Y10T 74/2119; Y02E 60/16
See application file for complete search history.

(56) References Cited

U.S. PATENT DOCUMENTS

| 5,452,625 A | * | 9/1995 | Nardone ............... F16F 15/305 74/445 |
| 5,566,588 A | | 10/1996 | Rosen et al. |

(Continued)

FOREIGN PATENT DOCUMENTS

WO    WO 2012/043939 A1    4/2012

*Primary Examiner* — Adam D Rogers
(74) *Attorney, Agent, or Firm* — Tarolli, Sundheim, Covell & Tummino LLP (57) ABSTRACT

The flywheel energy storage device (3) comprises a rotor (2) with at least two hubs (11, 12) and a drive (33) for the rotor (2), whereby the rotary element (23) is mounted at least via the first hub (11) with the first journal (21) in a first bearing (31) of the flywheel energy storage device (3), and at least via the second hub (12) with the second journal (22) in a second bearing (32) of the flywheel energy storage device (3), and the rotor (2) can be made to rotate by means of the drive (33) via the first and/or second journals (21, 22), whereby the journals (21, 22) in the rotor (2) are connected to each other exclusively via the hubs (11, 12) and via the rotary element (23).

13 Claims, 4 Drawing Sheets

(56) References Cited

U.S. PATENT DOCUMENTS

| | | | | |
|---|---|---|---|---|
| 5,784,926 A | * | 7/1998 | Maass | B29C 70/48 |
| | | | | 74/572.12 |
| 5,816,114 A | | 10/1998 | Gregoire et al. | |
| 5,946,979 A | | 9/1999 | Waagepetersen | |
| 6,583,528 B2 | * | 6/2003 | Gabrys | F16F 15/305 |
| | | | | 310/74 |
| 8,584,552 B2 | * | 11/2013 | Gottfried | H02K 7/02 |
| | | | | 74/572.11 |
| 2004/0076809 A1 | * | 4/2004 | Spears | B32B 5/02 |
| | | | | 428/292.1 |
| 2006/0053959 A1 | * | 3/2006 | Park | F16F 15/315 |
| | | | | 74/572.2 |
| 2010/0018344 A1 | | 1/2010 | Spears et al. | |
| 2015/0128757 A1 | * | 5/2015 | Schulz | H02K 7/025 |
| | | | | 74/572.21 |
| 2016/0061288 A1 | * | 3/2016 | Ozaki | F16F 15/30 |
| | | | | 74/572.12 |

\* cited by examiner

FLYWHEEL ENERGY STORE

FIELD OF THE INVENTION

The invention relates to a hub for rotors for flywheel energy storage devices as well as to a rotor having such a hub, and it also relates to a flywheel energy storage device having such a rotor as well as to a method for the production of such a hub.

BACKGROUND OF THE INVENTION

Flywheels are used to store energy in the form of rotational energy. Suitable coupling means can be used to store electric energy in the form of rotational energy in these energy storage devices and, as needed, it can be converted back into electric energy and supplied to a consumer. For the most part, such flywheel energy storage devices have a hollow cylinder as the rotor which stores a certain amount of energy as a function of its rotational speed and mass. The storage capacity of such an energy storage device is limited by its maximum rotational speed. The rotor is usually connected via suitable connection means to a bearing shaft that holds the rotor. The bearing shaft is rotatably mounted in appropriate bearings. The bearing and drive elements are preferably situated on the rotational axis of the rotor. Here, the connection means have the task of connecting and affixing the outer flywheel element (cylinder) to the idle axle (shaft) and of transferring the torsional moment from the drive shaft to the flywheel element and vice versa. The formula for calculating the energy value of a rotary element shows that the rotating element with a high energy value should preferably he configured for a high speed rather than for a high mass. Therefore, nowadays, high-capacity energy storage, devices generally no longer use rotors made of steel, even though steel has a high strength.

Regenerative sources of energy are used nowadays, particularly because of their better environment friendliness as compared to conventional power generating systems. Since, as a rule, these regenerative sources of energy do not supply their energy continuously, there is a great demand for energy storage devices. Therefore, it would be desirable if the energy value of such a flywheel energy storage device could be farther increased while nevertheless lowering the costs for their production.

SUMMARY OF THE INVENTION

It is an objective of the present invention to provide suitable inexpensive and reliable components for a flywheel energy storage device with which the flywheel energy storage device can have a high energy value and yet whose mounting can he implemented easily, cost-effectively and reliably.

This objective is achieved by a hub for rotors for flywheel energy storage devices, whereby the hub is made in one single piece of a carbon fiber-reinforced plastic laminate consisting of a woven braid of carbon fibers that intersect at a braid angle and consisting of a matrix material, and it comprises at least three geometrically different sections, whereby a first section—with its first diameter—provided for accommodating a journal that is to be mounted in a bearing of the flywheel energy storage device extends cylindrically parallel to the provided rotational axis of the hub, a second section—with its second diameter that is greater than the first diameter—provided for connection with the rotary element of the rotor extends cylindrically parallel to the provided rotational axis of the hub, and the first and second sections are connected to each other by means of a conically shaped third section having a constant wall gradient, and whereby the carbon fiber-reinforced plastic laminate has an extensibility that is adapted to the elongation of the rotary element under the operating conditions of the flywheel energy storage device.

In order to maximize the energy value of a flywheel energy storage device, said device is brought up to a maximum rotational speed with a low intrinsic weight since the rotational speed enters into the maximum energy value quadratically, whereas the weight only does so linearly. Here, the rotary element of the flywheel energy storage device (as a rule, a hollow cylinder) is connected by two or more hubs to the bearing and drive-elements of the flywheel energy storage device. On the one hand, the hubs have to connect and affix the rotary element to the bearing and drive elements and, on the other hand, they have to transfer the torsional moments from a drive shaft to the rotary element and vice versa. The hub according to the invention is characterized in that it is mechanically sufficiently strong and thus reliable so that it can withstand the radial and tangential loads at very high speeds of more than 50,000 rpm stemming from the centrifugal forces acting on the rotary element, can support the weight load from the rotary elements, can withstand the pressing forces that act at these rotational speeds on the connection sites between the rotary elements and the hub, for example, between the hub and the journals, and yet can ensure an effective transfer of the torques between the drive unit and the rotary element, thanks to the tangential dimensional stability. Owing to its material and its geometrical shape, the hub according to the invention also has a radial extensibility that can be appropriately adapted so that it can follow the elongation of the rotary element, especially at very high rotational speeds. In this manner, critical tensile stresses between the rotary element and the hub can be avoided, which could otherwise cause damage to the hub or could cause the rotary element to bend or to become detached from the hub at very high rotational speeds. Moreover, thanks to the use of a carbon fiber-reinforced plastic laminate, the hub according to the invention also results in a benign crash behavior in case the rotor in the flywheel energy storage device falls off. Furthermore, the weight of the hub and therefore of the rotor can be reduced as compared to conventional hubs and corresponding rotors, which translates into a simpler mounting of the rotor. The structure of the hub according to the invention as a one-piece component also permits a cost-effective production of the huh, which consequently permits a more cost-effective production of the rotor for the flywheel energy storage device.

The hub according to the invention is made in one piece of a carbon fiber that is joined to a matrix system. The composite structure created by the matrix system together with the woven braid made of carbon fibers is referred to as a carbon fiber-reinforced plastic laminate. Here, the matrix material completely surrounds the woven braid made of carbon fibers. The structure of the laminate and the geometry of the hub are the determining factors for the mode of operation. The strength and stiffness of the carbon fiber-reinforced plastic laminate, as is the case with all fiber-matrix composites, is much higher in the fiber direction than crosswise to the fiber direction. Crosswise to the fiber, the strength is less than with a non-reinforced matrix. Therefore, individual fiber layers are laid in different directions, here as a woven braid of carbon fibers. In such a woven braid, the carbon fibers intersect each other in two different orientations. The specific orientation of the fibers is indicated by the angle of the carbon fibers relative to the rotational axis of the hub. This angle is referred to as the fiber angle. For example, the carbon fibers in one orientation have a projected fiber angle relative to the rotational axis of the hub of 0° and, in the other orientation, they have a projected angle relative to the rotational axis of the hub of considerably more than 0°, whereby the difference of the fiber angle corresponds to the angle at which the individual carbon fibers intersect. The angle at which the carbon fibers intersect is referred to as the braid angle. The braid angle and the fiber angle can each be adapted to the application in question and to the required extensibility of the carbon fiber-reinforced plastic laminate. In one embodiment, the carbon fibers in the carbon fiber-reinforced plastic laminate are striated fibers having a surface running parallel to the surface of the carbon fiber-reinforced plastic laminate, and the carbon fibers are arranged at a fiber angle within the range from −60° to −60° relative to the rotational axis. Here, the fiber angle is the angle at which the fibers that are projected onto the rotational axis are arranged relative to the rotational axis.

The term "woven braid" refers to the product obtained by entangling at least two fibers of flexible material with each other in order to form a layer of woven braid. An entire woven braid, however, can also comprise several layers of woven braid. Consequently, a woven braid cannot consist of one single thread alone, as a result of which it constitutes the opposite of a wound element. In a layer of woven braid, the fibers (threads) intersect at a braid angle, whereby fibers (or threads) that run next to each other alternately pass under and over the intersecting fibers (or threads), and each adjacent thread passes over or under in a diametrically opposing manner. Here, the number of intersecting first and second fibers per unit of surface area is essentially the same.

The woven braid can be made with differing levels of tightness so that, between the individual carbon fibers, there is a volume whose number and size vary and which is only filled with matrix material. A large fiber volume is desired when the carbon fiber-reinforced plastic laminate is being produced. The modulus of elasticity (E-modulus) of the fibers has to be higher than that of the matrix material. In one embodiment, the carbon fiber-reinforced plastic laminate comprises several layers of carbon fibers made of the appertaining woven braid. Here, the woven braid described above by way of example is one single layer in the carbon fiber-reinforced plastic laminate. The multiple layers correspond to several woven braids stacked one above the other.

These woven braids can be arranged on top of each other or else they can each be separated by matrix material. Such carbon fiber-reinforced plastic laminates with several layers have a particularly high extensibility and, at the same time, high tensile strength. In a preferred embodiment, the carbon fiber-reinforced plastic laminate consists of 3 to 5 layers, where extensibility and tensile strength are especially optimal for operation at very high rotational speeds. This applies particularly in an embodiment in which at least several layers consist of high-strength carbon fibers that are reinforced with high-strength carbon fibers in the form of stationary threads. The term stationary threads refers to carbon fibers that are arranged in the woven braid in a radial direction. In a preferred embodiment, the stationary threads are arranged at a fiber angle of 0° relative to the rotational axis. High-strength carbon fibers are, for example, T700 or T800 carbon fibers, or so-called HT or HM carbon fibers. These carbon fibers can have different thicknesses, depending on the embodiment.

The matrix material has to foe selected in such a way that it adheres to the fiber, since otherwise, the carbon fiber-reinforced plastic laminate will fail due to fiber pull-out. Any suitable resin system, for instance, thermosetting plastics or thermoplastics, can be used as the matrix material. The matrix system has no further chemical properties. In one embodiment, the matrix material is an epoxy resin or a polyurethane resin. These matrix materials account for very high productivity, thanks to the fact that they cure quickly during the hub production process, along with low material costs.

When it comes to the extensibility of the carbon fiber-reinforced plastic laminate, the radial extensibility is of particular significance here since the diameter of the rotary element increases as the rotational speed rises, and the hub has to follow this elongation in order to avoid additional tensile stresses. Whereas the first section is supposed to surround the later journal and whereas the connection to the rotary element is supposed to be created via the second section, the third section is shaped conically with a constant wall gradient according to the invention in order to compensate for the elongation of the rotary element. The term "constant wall gradient" refers to a surface that rises continuously (or falls continuously) from the second to the first section. A surface with a constant wall gradient has no indentations or bulges. However, the wall gradient of the third section does not have to be constant but rather, it can optionally be greater in some areas than in other areas. In one embodiment, when the hub is at a standstill, the third section is arranged at an angle between 40° and 50° relative to the surface of the first or second section. In a preferred embodiment, the angle is 45°±2°. The numbers given above refer to the angle between the surface of the third section and the surface normal of the first section facing outwards (away from the rotational axis) or else they refer to the angle between the surface of the third section and the surface normal of the second section facing inwards (towards the rotational axis). A carbon fiber-reinforced plastic laminate with a third section having a wall gradient in the above-mentioned angular range has sufficient adaptability for the elongation of the rotary element (increase in the diameter) during operation of the rotor. In a preferred embodiment, the carbon fiber-reinforced plastic laminate has a suitable extensibility, especially in the second and third sections, in order to yield to the elongation of the rotary element when the hub rotates by an angle that decreases due to the rotation under the operating conditions of the flywheel energy storage device.

The invention also relates to a rotor for a flywheel energy storage device, whereby the rotor comprises a rotary element having a cylindrical shape with open ends and a central cylindrical axis along the cylindrical shape, whereby the cylindrical axis or balance axis of the rotary element is provided as the rotational axis in the flywheel energy storage device and comprises at least a first and a second hub according to the present invention, whereby the hubs with the same orientation are connected to the rotary element via the appertaining second sections and each of the first sections of the hubs is connected to one of the journals that are provided for mounting the rotary element in the appertaining first and second bearings of the flywheel energy storage device. The cylindrical axis is the rotational axis in the case of ideally symmetrical cylinders. However, in case of non-ideal cylinders, the rotational axis can also be the balance axis.

The term rotor refers to the totality of the parts that are made to rotate in a flywheel energy storage device for purposes of storing energy. The rotors can have different shapes. In the present invention, the rotor has a rotary element with a cylindrical shape. The rotary element is the component that mainly stores the energy in the form, of movement energy. The remaining components connect the rotary element to a drive or to a bearing for the rotor so that the latter can rotate with as little loss as possible, in the present invention, the rotary element is a cylinder that is open on both sides (ends). In order for this open cylinder to be held in a bearing, it is connected via at least two hubs to associated bearings (first bearing for the first hub and second bearing for the second hub). This connection is not made directly by the hubs, but rather by a journal that is attached in the appertaining hub to at least a first section, for example, by a pressing procedure with the carbon fiber-reinforced plastic laminate of the hub. The hubs thus close the cylinder, at least partially, towards its ends. The hubs are arranged in the rotary element with the same orientation or direction. The term same orientation means that the third sections have a wall gradient with the same orientation so that, in this orientation, the hubs could also be placed directly on top of each other. With a perpendicularly oriented cylindrical rotary element—that is to say, with a perpendicular cylindrical axis as the center axis of the cylinder (referred to here as the central cylindrical axis) that passes through the two open ends of the cylinder—in case of hubs with the same orientation, each of the first sections of all of the hubs is arranged hi the rotary element above the second sections, or correspondingly vice versa, the first sections of all of the hubs are arranged in the rotary element below the second sections. The hubs can be arranged in the rotary element in any desired suitable position provided that the journal has a shape that allows it to be mounted in a bearing for the rotor. In the rotary element, the hubs are connected to the rotary element so that the same hubs can be connected to the rotary element with the same orientation. In contrast, if a hub were to be pulled back down over an open end of the rotary element for purposes of being connected to the rotary element, then this hub would have to have a larger cross section than the other hub for the other end of the rotary element in ease of attachment in the same orientation. In one embodiment, the hubs are arranged in the rotary element in the area of the open ends. The term "in the area" refers to the area of the rotary element that extends from the open end along the rotary element up to the position in which a hub—with a journal that is attached with its second section to the rotary element in this position—just barely projects with its journal beyond the open end of the rotary element. The connection to the rotary element can be made by means of pressing or gluing or else by means of some other suitable technique.

In the first section of the hub, when the rotor is produced, there is a journal that is to be mounted in a bearing of the flywheel energy storage device. This journal can be pressed, for example, onto the hub. The journal can be made of metal and is preferably made of a material without voids so that it is sturdy and has symmetrical rotating properties. Preferably, the journal is a compact filled volume. The rotor in the flywheel energy storage device is rotated via the journal.

In one embodiment, the journals in the rotor are connected to each other exclusively via the hubs and the rotary element. This rotary element is hollow between the hubs, that is to say, it does not have a continuous shank. As a result, the hubs and the journals can be used for rotary elements of different lengths without there being a need to adapt or provide a shank on the cylindrical axis. Consequently, the construction of the rotor is further simplified.

In one embodiment, more than two hubs are arranged in the rotary element, and at least two hubs are connected to the same journal. With an arrangement of one hub at one open end and two hubs connected to each other via the journal at the other end of the rotary element, different rotor dynamics can be set than if there were just one hub at each of the two ends of she rotary element. Different dynamics can be advantageous for different applications and operating conditions or bearings. The term dynamics refers to the rotation behavior, especially to the occurrence or non-occurrence of resonances at certain rotational speeds.

In one embodiment, the rotary element consists of a carbon fiber-reinforced plastic laminate made of carbon-fiber-reinforced plastic and a matrix system. Rotary elements made of this material are lightweight and can be brought up to higher rotational speeds on the same bearings than rotary elements that are made, for example, of metal. Consequently, rotors with rotary elements made of carbon fiber-reinforced plastic laminate can store more energy than metal rotors.

In one embodiment, the journals are made of metal and are pressed onto the associated hubs. Such journals permit a reproducible and low-loss mounting in the flywheel energy-storage device.

The invention also relates to a flywheel energy storage device comprising a rotor according to the present invention, with at least two hubs according to the present invention and a drive for the rotor, whereby the rotary element is mounted at least via the first hub with the first journal in a first bearing and at least via the second hub with the second journal in a second bearing of the flywheel energy storage device, and the rotor can be made to rotate by means of the drive via the first and/or second journals. Due to the same orientation of the hubs in the rotary element, the elongation of the rotary element at high rotational speeds and a corresponding yielding of the hubs to compensate for the elongation do not bring about a shift in the position of the journals in the bearings. Instead, the angle of the third section relative to the first section that changes due to the elongation of the rotary element leads to a shift in the position of the rotary element along the rotational axis in the direction of the first section. If the housing around the rotor was selected sufficiently large, this shift in the position of the rotary element between the resting position and the operating position has no further significance. The arrangement or the orientation of she hubs depends essentially on the dynamics of the rotor. When suitable bearings are used, the length compensation of the hubs does not play a role, since here instead, the position of the rotary element changes during operation. In a preferred embodiment, the first and second bearings are magnetic bearings, preferably active magnetic bearings, and the journals are mounted in the bearings along the rotational axis so as to be essentially stationary. As a result, the bearings can be configured to be more precise and thus more loss-free, and the energy transfer to the rotor and back can be carried out more effectively. The dynamics of the components, namely, the hub and the rotary element, are influenced as a function of the configuration of the metal journals which are pressed into the hubs and onto which the force-introduction elements such as the bearings and the motor are attached. Thus, a simple arrangement with one hub at each end of the rotary element can be sufficient for the operation of the flywheel energy storage device. For purposes of achieving different dynamics, a so-called multiple arrangement with several hubs on a journal at one or both ends of the rotary element can be favorable. Thus, the dynamic properties of the rotor in flywheel energy storage devices can be systematically varied in such a way that, for example, the critical rotational speeds fall outside of the working range and are thus not relevant for the operation. The term critical rotational speeds refers to the rotational speeds at which vibrations and resonances occur in the rotor.

The invention also relates to a method for the production of a hub according to the present invention, comprising the steps
- production of a blank consisting of a woven braid of carbon fibers that intersect at a fiber angle with at least three geometrically different sections, whereby the first section having a first diameter extends cylindrically parallel to the provided rotational axis of the later hub, the second section having a second diameter that is greater than the first diameter extends cylindrically parallel to the provided rotational axis of the later hub, and the first and second sections are connected to each other via a conically shaped third section of the later hub having a constant wall gradient, whereby the fiber angle varies as a function of the diameter of the braid,
- filling a mold with the blank, whereby the mold has an inner volume that corresponds to the carbon fiber-reinforced plastic laminate that is to be produced,
- production of the carbon fiber-reinforced plastic laminate in an RTM (resin transfer molding) process making use of an epoxy resin or a polyurethane resin as the matrix material that is to be injected, at a cycle time of preferably less than 30 minutes, and
- removal of the cured carbon fiber-reinforced plastic laminate as the hub.

The blank preferably consists of high-strength carbon fibers, preferably an HF fiber, for example, a T700 fiber made by the Toray Company. The woven braid is braided employing conventional means. In a so-called overbraiding process (hose sheathing process), the blank receives the necessary fibers in the radial and tangential direction. This production process gives rise to a dimensionally stable blank consisting of one or several layers having the three specified sections. In one embodiment of the method, the blank comprises several layers of woven braid made of carbon fibers, preferably 3 to 5 layers. During the overbraiding process, the necessary fiber portions and fiber orientations of the blank are created. They consist of 0° fiber layers relative to the rotational axis of the later hub and of the fiber layers with a fiber orientation between ±60° relative to the rotational axis. Here, the fiber angle (and thus the braiding angle as well) varies as a function of the diameter of the braid (diameter of the blank at this specific place). The smaller the diameter of the braid becomes with a constant number of braid fibers, the smaller the fiber angle relative to the rotational axis of the hub. Therefore, the braiding process has to be configured in such a way that all of the areas of the hub acquire a fiber distribution or fiber orientation (fiber angle) of the type needed for the operation of the finished hub. The blank is further processed in a subsequent RTM process (so-called resin-transfer molding or compression molding) so that the final result is a hub in the form of a carbon fiber-reinforced plastic laminate, consisting of the requisite carbon fibers with the desired orientation and the appropriate resin system as the matrix material. The matrix material is selected in such a way that it cures as quickly as possible in order to achieve a cycle time (compression time+curing time+time for refilling) for the RTM process that is preferably less than 30 minutes. Such a short cycle time permits a cost-effective production of the hubs.

BRIEF DESCRIPTION OF THE FIGURES

These and other aspects of the invention are shown in detail in the figures as follows:

FIG. 1 an embodiment of a hub according to the invention in (a) a side sectional view and (b) in a top view, as seen from above, FIG. 2 an embodiment of the structure of the (a) woven braid and (b) of the carbon fiber-reinforced plastic laminate.

DETAILED DESCRIPTION OF THE EMBODIMENTS

Figure 1:
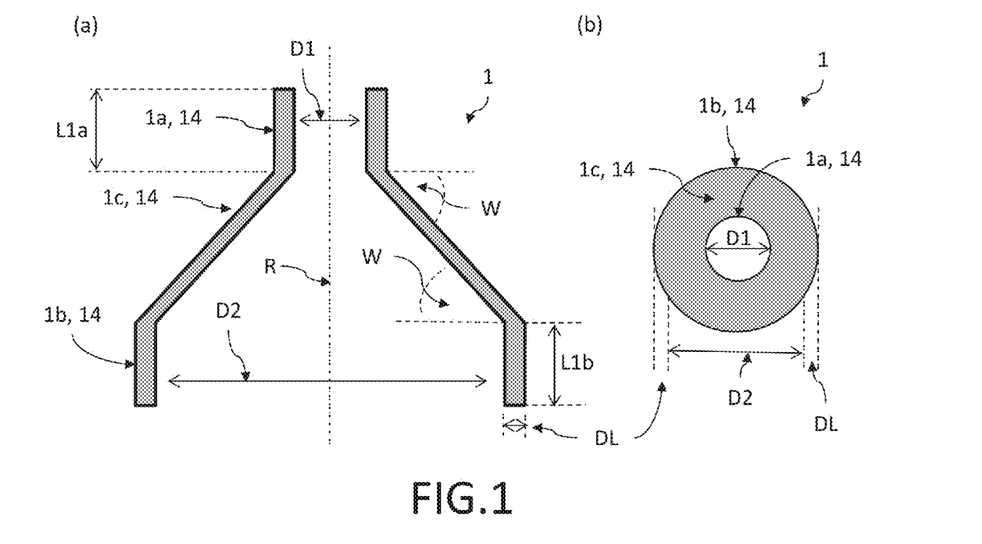

FIG. 1 shows an embodiment of a hub according to the invention in (a) a side sectional view and (b) in a top view, as seen from above. The hub 1 is made in one piece of a carbon fiber-reinforced plastic laminate 14 with a woven braid 15 of carbon fibers 15a, 15b, 15c that intersect each other at a braid angle FL, and of a matrix material 16. The laminate 14 of the present invention is thus not a so-called lay-up (layering and joining) consisting of several separate laminate layers laid on top of each other. In this embodiment, the hub 1 comprises three geometrically different sections 1a, 1b, 1c, whereby a first section 1a having a first diameter D1 and a length L1a extends cylindrically parallel to the provided rotational axis R of the hub 1. This first section 1a is provided to accommodate a journal 21, 22 having an outer diameter D1 for mounting in a bearing 31, 32 of the flywheel energy storage device 3. A second section 1b of the hub 1 having a second diameter D2 that is greater than the first diameter D1 and a length L1b extends cylindrically parallel to the provided rotational axis R of the hub 1. The second section 1b is provided for purposes of connection to a rotary element 23 of the rotor 2. Since the hub has a wall thickness DL at least in the third section, the inner diameter of the rotary element has to be equal to D2+2*DL. The first section 1 and the second section 1b are connected to each other via a conically shaped second section 1c with a constant wall gradient. The carbon fiber-reinforced plastic laminate has an extensibility that is adapted to the elongation of the rotary element 23 under operating conditions of the flywheel energy storage device 3, which depends on the material of the rotary element 23 and on the speed. FIG. 1(a) shows a side sectional view of the hub 1 along the largest diameter. The sections 1a, 1b, 1c have surrounding arrangements, which, for the sake of clarity, are not shown in FIG. 1(a). FIG. 1(b) shows a top view of the hub 1 having the first section 1a at the top in a view, as seen from above. This depiction shows the conically surrounding surface of the third section 1c. In this embodiment, when the hub 1 is at rest, the third section 1c has an angle W of 45° to the surface of the first or second section 1a, 1b. The angle W encloses the surface of the third section 1c and the surface normal of the first section 1a facing outwards (away from the rotational axis R) or else it encloses the surface of the third section 1c and the surface normal of the second section 1b facing inwards (towards the rotational axis R). Due to the carbon fiber-reinforced plastic laminate 14, the hub 1 has a suitable extensibility, especially in the second section 1b and in the third section 1c, to yield to the elongation of the rotary element 23 under operating conditions of the flywheel energy storage device 3 when the hub 1 rotates by an angle W, which becomes smaller due to the rotation. In this embodiment, the third section has a constant wall gradient of 45° without indentations or bulges.

Figure 2:
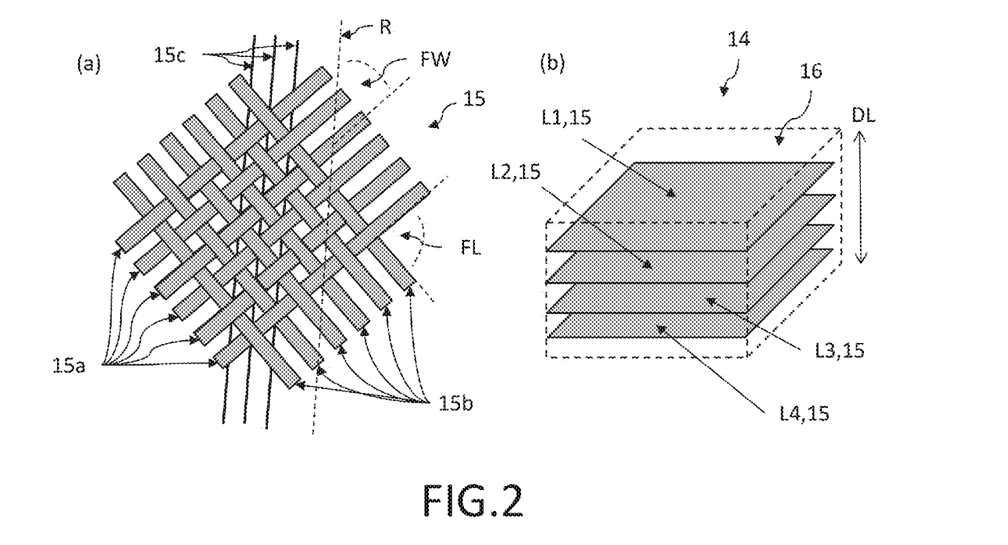

FIG. 2 shows an embodiment of the structure of the (a) woven braid and (b) of the carbon fiber-reinforced plastic laminate. FIG. 2a shows the characteristic aspect of a woven braid 15 that is the product obtained by entangling at least two fibers 15a, 15b, and in this embodiment, additionally the thread 15c consisting of flexible material. Consequently, the woven braid 15 shown cannot be made of one single thread alone, as a result of which it constitutes the opposite of a wound element. A layer of woven braid 15, the fibers 15a, 15b (and threads 15c) intersect at a braid angle FL, whereby fibers 15a that run next to each other alternately pass under and over the intersecting fibers 15b, and each of the adjacent fibers 15a, 15b pass over or under in a diametrically opposing manner. Each woven braid layer (layer consisting of woven braid) L1, L2, L3, L4 is thus not a layer with a uniaxial fiber orientation, but rather, it has fibers 15a, 15b with at least two different fiber orientations. Moreover, in the woven braid 15 shown in FIG. 2a, the number of intersecting carbon fibers 15a, 15b per unit of surface area is essentially the same (here six carbon fibers 15a and six carbon fibers 15b). The carbon fibers 15a, 15b in the carbon fiber-reinforced plastic laminate 11 are striated fibers having a surface running parallel to the surface of the carbon fiber-reinforced plastic laminate 14, whereby in this embodiment, the carbon fibers 15a, 15b intersect at a braiding angle FL of about 90°. Preferably, the woven braid is arranged relative to the rotational axis of the hub 1 in such a way that the carbon fibers 15a, 15b are arranged at a fiber angle FW within the range from −60° to +60° relative to the rotational axis R of the hub 1. Here, the fiber angle FW is the angle between the fibers projected onto the rotational axis R and the rotational axis R itself. Additional carbon fibers 15c are braided into the striated fibers as so-called stationary threads 15c at a fiber angle FW of 0° relative to the rotational axis R of the hub 1. FIG. 2(b) shows the carbon fiber-reinforced plastic laminate 14 with four layers L1, L2, L3, L4 (depicted in gray) of the appertaining woven braid 15 made of carbon fibers 15a, 15b, 15c. A preferred number of layers is 3 to 5 layers. Several layers can comprise, for example, T700-12k carbon fibers 15a, 15b into which the T700-24k carbon fibers 15c are braided in as 0° stationary threads. T800 carbon fibers can also be used as the carbon fibers for the woven braid 15 and/or for the stationary threads 15c. Other suitable high-strength carbon fibers can also be the so-called HT or HM carbon fibers. These carbon fibers can have different thicknesses. In one embodiment, the matrix material 16 covering or sheathing the carbon fibers 15a, 15b, 15c is an epoxy resin or a polyurethane resin.

Figure 3:
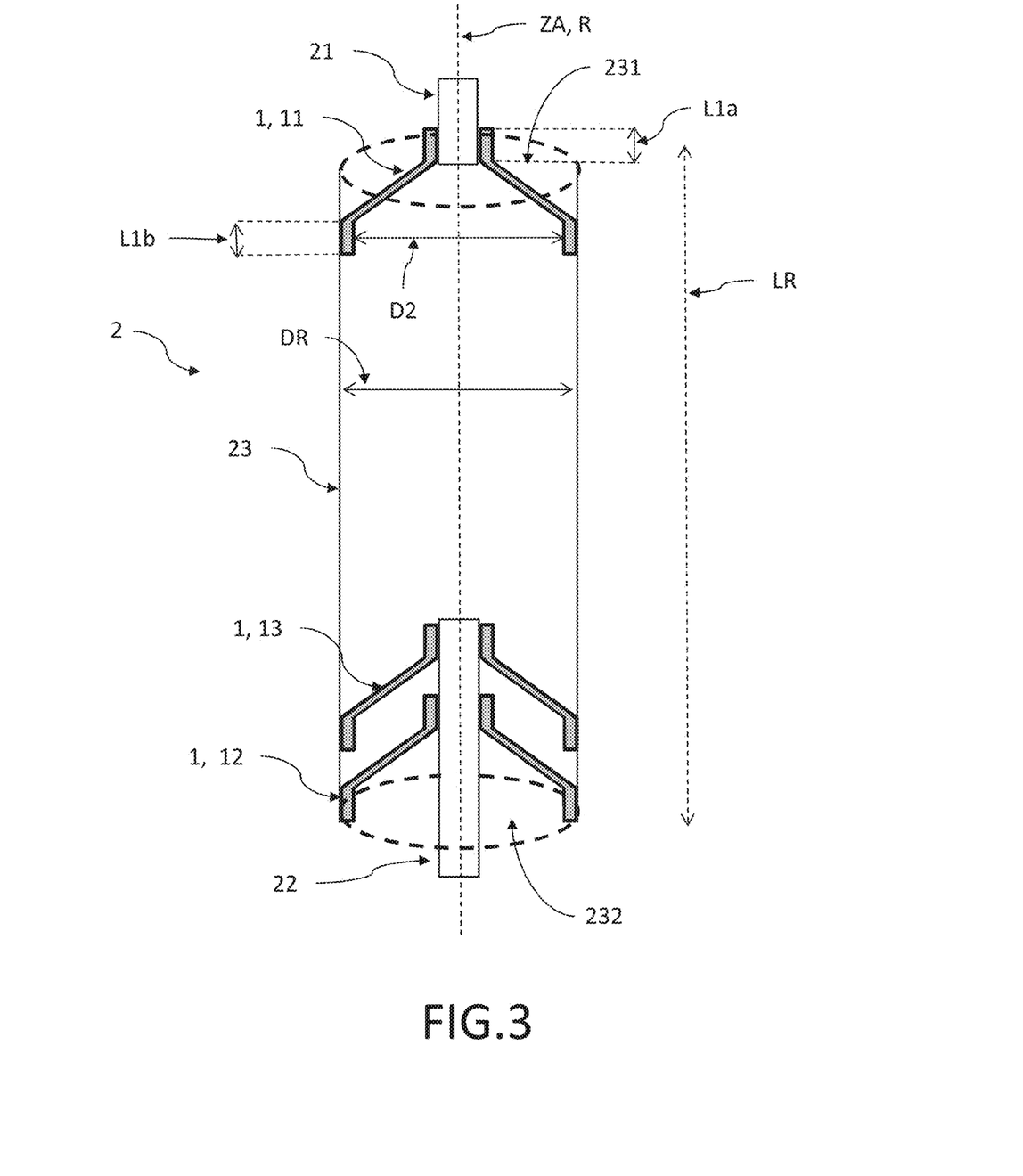
FIG. 3 an embodiment of a rotor according to the invention, with three hubs, attached o the first and second journals of the rotor, FIG. 4 an embodiment of a flywheel energy storage device according to the invention, with a rotor according to FIG. 3, FIG. 5 change in the position and diameter of the rotary element as well as in the angle of the third section of the hub for (a) rotary element at rest and (b) during operation (rotation).

FIG. 3 shows an embodiment of a rotor 2 according to the invention, with three hubs 11, 12, 13 attached to the first and second journals 21, 22 of the rotor 2. The rotor 2 for the flywheel energy storage device 3 comprises a rotary element 23 having a cylindrical shape with open ends 231, 232 and a central cylindrical axis ZA along the cylindrical shape that is provided as the rotational axis R in the flywheel energy storage device 3. In this embodiment, the upper end 231 of the rotary element 23 is connected to a first journal 21 via a first hub 11, while the lower end 232 is connected to a second journal 22 via a second and third hub 12, 13. Here, the hubs 11, 12, 13 are connected to the rotary element 23 with the same orientation via the appertaining second sections 1b, whereas the appertaining first sections 1a of the hubs 11, 12, 13 are connected to the appertaining journals 21, 22. This embodiment of the hub arrangement is also referred to as a multiple arrangement and it influences the dynamics of the rotary element 23 or of the rotor 2. Thus, the dynamic properties of the rotor 2 in flywheel energy storage devices 3 can be systematically varied in such a way that, for example, critical rotational speeds fall outside of the working range and are thus not relevant for the operation. The term critical rotational speeds refers to the speeds at which vibrations and resonances occur in the rotor 2. In other embodiments, there can be just one hub arranged at each end of the rotary element 23. Such arrangements are referred to as simple arrangements. In other embodiments, in each case, two or more hubs 1 can be arranged on a journal 21, 22 for purposes of connection to the rotary element 23. The number of hubs 1 on the appertaining journals 21, 22 depends on the design of the rotary element 23, on its dimensions, and on the desired rotational speed range during operation of the fly wheel energy storage device 2.

As can be seen in the sectional drawing in FIG. 3 of the rotor, the journals 21, 22 in the rotor 2 are connected to each other exclusively via the hubs 11, 12, 13 and the rotary element 23. The rotor according to the invention is hollow and empty inside the volume formed by the first and third hubs 11, 13, the first and second journals 21, 22, and the rotary element 23, and inside this volume, in this embodiment, it especially has no shank or shaft along the rotational axis R. Therefore, the rotor 2 according to the invention shown, in FIG. 3 does not have a continuous shank. Here, the rotary element 23 comprises, for example, a carbon fiber-reinforced plastic laminate made of carbon-reinforced plastic and a matrix system in order to reduce the weight of the rotary element 23. In order to improve their strength, the journals 21, 22 are made of metal and are pressed together with the appertaining hubs 11, 12, 13.

The rotor 2 shown in FIG. 3 has a length LR, for example, of 1300 mm, an outer diameter of 350 mm, and a wall thickness of 20 mm. The weight of the rotor 2 is 40 kg. The hubs 11, 12, 13 have an outer diameter of 310 mm, the first section has a length L1 of 30 mm, and the second section has a length L1b of 50 mm. The wall thickness of the first, second and third sections is several millimeters or more. The inner diameter of the cylindrical first section is 100 mm. The angle W of the surface of the third section 1c relative to the surface of the first and second sections 1a, 1b amounts to 45° at rest. The laminate structure consists of 3 to 5 layers L1, L2, . . . of woven braid 15 made of a T700-12k fiber into which fibers with a fiber angle FW of 0°, for example, in the form of T700-24K fibers, have been woven for reinforcement purposes.

Figure 4:
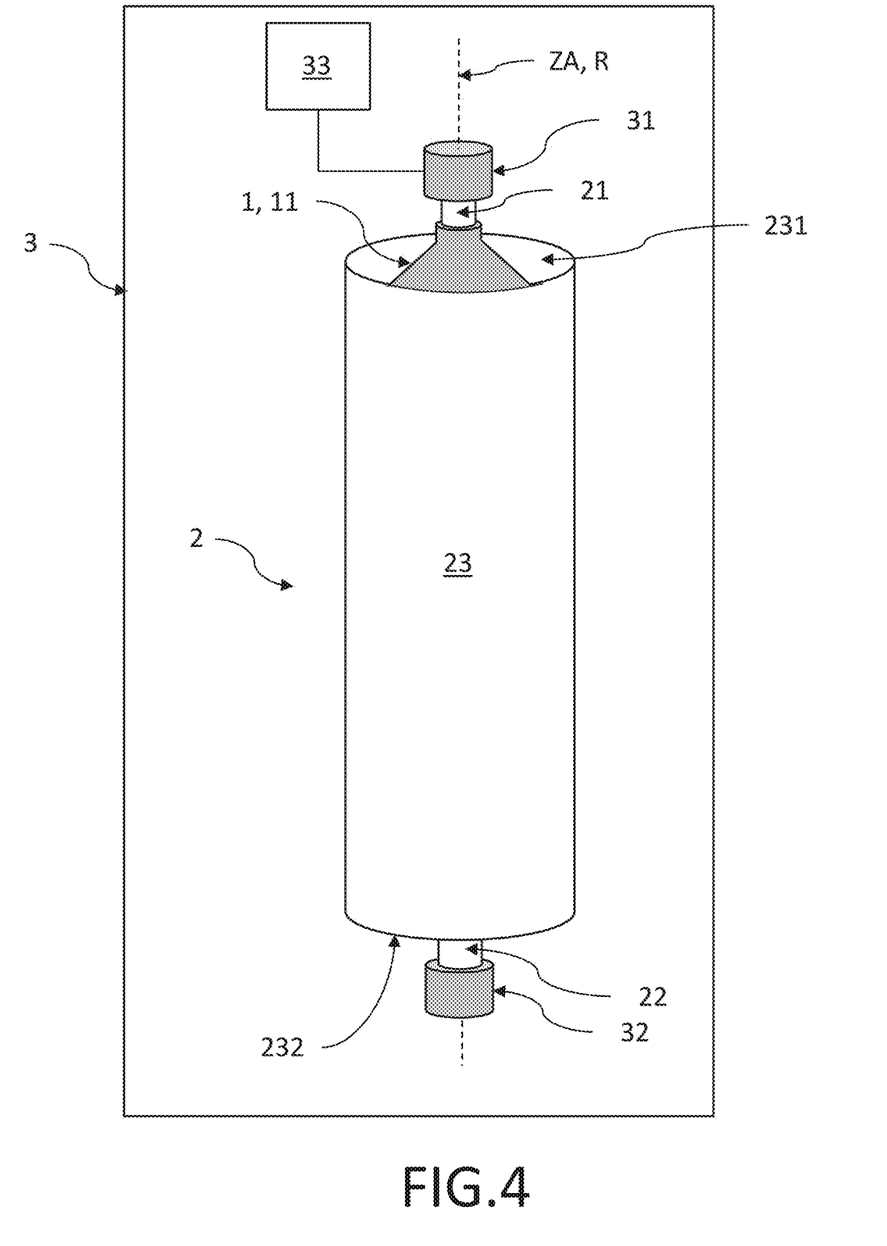

FIG. 4 allows an embodiment of a flywheel energy storage device according to the invention, with a rotor 2 according to FIG. 3. The flywheel energy storage device 3 comprises a rotor 2 with three hubs 11, 12, 13 of which only the first hub 11 (shown in black) is visible in the perspective view, and u also comprises a drive 33 for the rotor 2, whereby the rotary element 23 is mounted in a first bearing 31 via the first hub 11 having a first journal 21, and in a second bearing 32 of the flywheel energy storage device via the second and third hubs having the second journal 22. The rotor 2 can be made to rotate by means of the drive 33 via the first and/or second journals 21, 22. The bearing 31, 32 can comprise axial bearings, radial bearings and emergency hearings. Here, in this embodiment, the first and second bearings 31,32 are active magnetic bearings. The rotor 2 in the flywheel energy storage device 3 is positioned vertically, that is to say, the cylindrical axis ZA as the rotational axis R is vertical. Here, the rotor 2 is surrounded by a container (not shown explicitly here) that is closed with an upper and a lower cover. The closed shell around the bearings 31,32 and the rotor 2 serve, on the one hand, to safeguard operational safety around the rotor 2 in case a rotor falls off and, on the other hand, to generate a vacuum so that the operation of the rotor 2 in the flywheel energy storage device 3 can be loss-free to the greatest extent possible. Moreover, this closed container is firmly anchored to the substrate by means of a baseplate. A flywheel energy storage device having a rotor as shown in FIG. 3 can pick up or generate an output of 5 kWh at a speed of 54,000 rpm. Due to the arrangement of the hubs in the rotary element, the journals 21, 22 are mounted so as to be essentially stationary in the bearings 31,32, whereas, during operation, irrespective of the journals 21, 22, the rotary element 23 moves along the rotational axis R, upwards (rising speed) or downwards (falling speed), depending on the speed-dependent elongation. Drives for flywheel energy storage devices are known to the person skilled in the art. Within the scope of the present invention, the person skilled in the art will select the right drive for the flywheel energy storage device according to the invention. The same applies to the components for transferring the drive torque to the journals and vice versa. In order to transfer the drive torque to the journals, said journals comprise one or more permanent magnets that are coupled via the magnetic field to a permanent magnet motor/generator in the bearings. This motor/generator can have an output, for example, of 10 kW to 100 kW.

Figure 5:
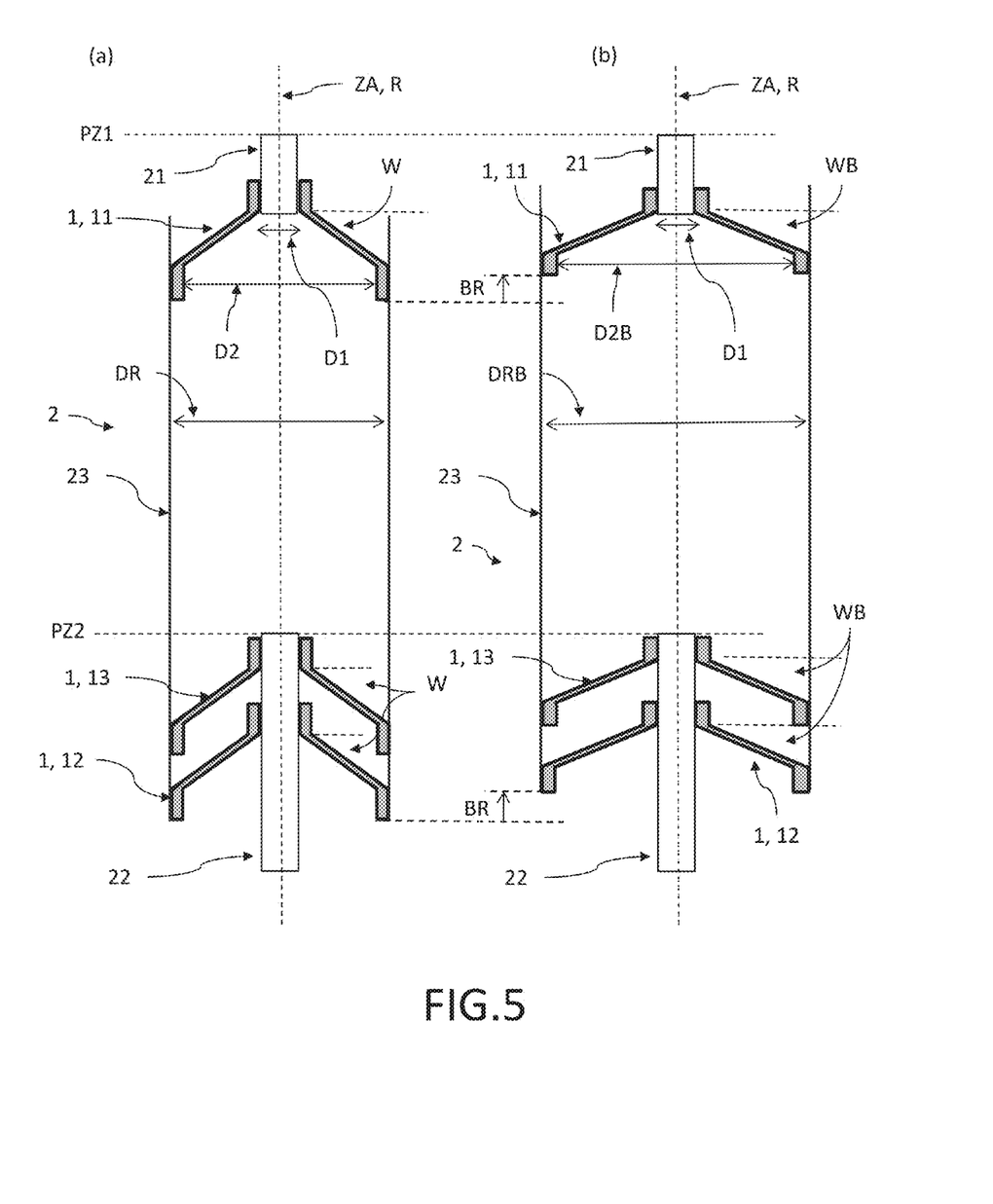

The change in the position and in the diameter of the rotary element as well as in the angle of the third section of the hub is shown in FIG. 5 for (a) the rotary element at rest and (b) the rotary element during operation. The suitably adapted material properties of the carbon fiber-reinforced plastic laminate (woven braid, fiber angle, braid angle, number of layers, matrix system, selection of the carbon fibers) and the geometric shape of the hub 11, 12, 13 impart the latter with a radial extensibility so that it can follow the elongation of the rotary element precisely at very high, rotational speeds, see FIGS. 5(a) and 5(b) for comparison purposes. In FIG. 5(a), the hubs 11, 12, 13 at rest have a wall gradient with an angle W of 45° and the rotary element has a resting diameter DR. The extensibility of the hubs 11, 12, 13, particularly in their third sections 1c, permits the hubs 11, 12, 13 to follow the elongation of the rotary element 23 caused by operation at high rotational speeds (see FIG. 5(b)) and the enlargement of the diameter DRB (greater than the diameter DR at rest) of the rotary element 23. Here, the wall gradient and the corresponding angle WB of the surface of the third section relative to the surface of the first and second sections during operation at high rotational speeds is smaller than the wall gradient or the angle W at rest. Correspondingly, the inner diameter of the second sections increases from an inner diameter D2 at rest to a diameter D2B during operation of the rotor 2. Such elongations can be, for instance, 1 mm to 2 mm, depending on the rotational speed. Thus, critical tensile stresses between the rotary element 23 and the hubs 11, 12, 13 that could otherwise damage the hubs 11, 12, 13, or bend or detach the rotary element 23 from the hubs 11, 12, 13 at very high rotational speeds. The diameter D1 of the first sections of the hubs 11, 12, 13 does not change during operation of the rotor 2 since these sections 1a are firmly pressed onto the journals 21, 22. Due to the smaller angle WB during operation of the rotor 2, the position of the rotary element 23 shifts upwards by a length BR of 1 mm to 2 mm during operation, depending on the rotational speed. In contrast, the positions PZ1, PZ2 of the first and second journals 21, 22 remain the same, regardless of whether the rotor is at rest or rotating. As a result, the bearings 31, 32 for the journals can be adjusted and operated more precisely. The precise positioning of the journals 21, 22 during operation allows the use of particularly suitable active magnetic bearings.

The embodiments shown here are only examples of the present invention and therefore must not be construed in a limiting fashion. Alternative embodiments considered by the person skilled in the art are likewise encompassed by the scope of protection of the present invention.

LIST OF REFERENCE NUMERALS 1 hub
11 first hub
12 second hub
13 third hub
1a first section of the hub
1b second section of the hub
1c third section of the hub
14 carbon fiber-reinforced plastic laminate
15 woven braid
16 matrix material
15a, 15b, 15c carbon fibers
2 rotor
21 first journal
22 second journal
23 rotary element
231, 232 open ends of the rotary element
3 flywheel energy storage device
31 first hearing of the flywheel energy storage device
32 second bearing of the flywheel energy storage device
33 drive for the rotor
BR movement of the rotary element along the rotational axis (during operation)
D1 first diameter
D2 second diameter (at rest)
D2B second diameter (during operation)
DL thickness of the laminate
DR diameter of the rotary element (at rest)
DRB diameter of the rotary element (during operation)
FL braid angle
FW fiber angle
L1a length of the first section of the hub along the rotational axis
L1b length of the second section of the hub along the rotational axis
LR length of the rotor
PZ1, PZ2 positions of the first/second journal
R rotational axis of the hub/rotor/rotary element
W angle of the surface of the third section relative to the surface of the first and second sections (at rest)
WB angle of the surface of the third section relative to the surface of the first and second sections (during operation)
ZA cylindrical axis

The invention claimed is:

1. A hub for a rotor for a flywheel energy storage device, whereby the hub is made in one single piece of a carbon fiber-reinforced plastic laminate consisting of 3 to 5 layers of a woven braid of carbon fibers obtained by entangling at least two carbon fibers of flexible material with each other that intersect at a braid angle per layer in order to form each of the layers of woven braid, whereby the carbon fibers in each of the layers that run next to each other alternately pass under and over the intersecting carbon fibers, and each adjacent fiber passes over or under in a diametrically opposing manner, wherein the layers are reinforced with stationary threads also made of carbon fibers, which are arranged in the woven braid arranged at a fiber angle of 0° relative to a rotational axis of the hub, and consisting of a matrix material, the hub further comprises at least three geometrically different sections, whereby a first section with a first diameter provided for accommodating a journal that is to be mounted in a bearing of the flywheel energy storage device extends cylindrically parallel to the rotational axis of the hub, a second section with a second diameter that is greater than the first diameter provided for connection with a rotary element of the rotor extends cylindrically parallel to the rotational axis of the hub, and the first and second sections are connected to each other by means of a conically shaped third section having a constant wall gradient, and whereby the carbon fiber-reinforced plastic laminate has an extensibility that is adapted to an elongation of the rotary element under operating conditions of the flywheel energy storage device.

2. The hub according to claim 1, wherein, when the hub is stationary, the third section is arranged at an angle between 40° and 50° relative to a surface of the first or second section.

3. The hub according to claim 1, wherein the carbon fibers in the carbon fiber-reinforced plastic laminate are striated fibers having a surface running parallel to a surface of the carbon fiber-reinforced plastic laminate, and the carbon fibers are arranged at a fiber angle within the range from −60° to +60° relative to the rotational axis.

4. The hub according to claim 1, wherein the matrix material is an epoxy resin or a polyurethane resin.

5. A rotor for a flywheel energy storage device, whereby the rotor comprises a rotary element having a cylindrical shape with open ends and a central cylindrical axis along the cylindrical shape, whereby the cylindrical axis of the rotary element is provided as a rotational axis of at least a first hub and a second hub in the flywheel energy storage device, whereby each of the hubs is made in one single piece of a carbon fiber-reinforced plastic laminate consisting of a woven braid of carbon fibers that intersect at a braid angle and consisting of a matrix material, and each hub comprises at least three geometrically different sections, whereby a first section with a first diameter provided for accommodating a first journal or a second journal that is to be mounted in at least one of a first bearing or a second bearing of the flywheel energy storage device that extends cylindrically parallel to the rotational axis of each hub, a second section with a second diameter that is greater than the first diameter provided for connection with the rotary element of the rotor extends cylindrically parallel to the rotational axis of each hub, and the first and second sections are connected to each other by means of a conically shaped third section having a constant wall gradient, and whereby the carbon fiber-reinforced plastic laminate has an extensibility that is adapted to an elongation of the rotary element under operating conditions of the flywheel energy storage device, whereby the hubs are connected to the rotary element in same orientations via the appertaining second sections, meaning that the wall gradient of the third section of each hub has the same orientation so that each hub is capable of being placed directly on top of each other, and the first section of each hub is connected to one of the first or second journals that are provided for mounting the rotary element in one of the first bearing or the second bearing of the flywheel energy storage device, whereby the first and second journals in the rotor are connected to each other exclusively via the hubs and via the rotary element.

6. The rotor according to claim 5, wherein additional to the first and second hubs a third hub is arranged in the rotary element, and the second and third hubs are connected to the same journal.

7. The rotor according to one of claims 5, wherein the rotary element consists of a carbon fiber-reinforced plastic laminate made of carbon fiber-reinforced plastic and of a matrix system.

8. The rotor according to claims 5, wherein the journals are made of metal and are pressed together with the at least first and second hubs.

9. A flywheel energy storage device, comprising a rotor that comprises a rotary element having a cylindrical shape with open ends and a central cylindrical axis along the cylindrical shape, whereby the cylindrical axis of the rotary element is provided as a rotational axis in the flywheel energy storage device and comprises at least a first and a second hub, whereby each of the hubs is made in one single piece of a carbon fiber-reinforced plastic laminate consisting of a woven braid of carbon fibers that intersect at a braid angle and consisting of a matrix material, and each hub comprises at least three geometrically different sections, whereby a first section with a first diameter provided for accommodating a first journal or a second journal, that is to be mounted in at least one of a first bearing or a second bearing of the flywheel energy storage device that extends cylindrically parallel to the rotational axis of each hub, a second section with a second diameter that is greater than the first diameter provided for connection with the rotary element of the rotor extends cylindrically parallel to the rotational axis of each hub, and the first and second sections are connected to each other by means of a conically shaped third section having a constant wall gradient, and whereby the carbon fiber-reinforced plastic laminate has an extensibility that is adapted to an elongation of the rotary element under operating conditions of the flywheel energy storage device, whereby the hubs are connected to the rotary element in same orientations via the appertaining second sections, meaning that the wall gradient of the third section of each hub has the same orientation so that each hub is capable of being placed directly on top of each other, and the first section of each hub is connected to one of the first or second journals that are provided for mounting the rotary element in one of the first bearing or the second bearing of the flywheel energy storage device, whereby the first and/or second journals in the rotor are connected to each other exclusively via the hubs and via the rotary element, and a drive for the rotor, whereby the rotary element is mounted at least via the first hub with the journal in the first bearing of the flywheel energy storage device, which is the first journal, and at least via the second hub with the journal in the second bearing of the flywheel energy storage device, which is the second journal, and the rotor can be made to rotate by means of the drive via the first and/or second journals.

10. The flywheel energy storage device according to claim 9, wherein the first and second bearings are magnetic bearings and the journals are mounted in the bearings along the rotational axis so as to be stationary.

11. The flywheel energy storage device according to claim 10, wherein the magnetic bearings are active magnetic bearings.

12. A method for the production of a hub comprising the steps
production of a blank consisting of 3 to 5 layers of a woven braid of carbon fibers obtained by entangling at least two carbon fibers of flexible material with each other that intersect at a braid angle per layer in order to form each of the layers of woven braid, whereby the carbon fibers in each of the layers that run next to each other alternately pass under and over the intersecting carbon fibers, and each adjacent fiber passes over or under in a diametrically opposing manner, with at least three geometrically different sections, whereby a first section having a first diameter extends cylindrically parallel to a rotational axis of the hub, a second section having a second diameter that is greater than the first diameter extends cylindrically parallel to the rotational axis of the hub, and the first and second sections are connected to each other via a conically shaped third section of the hub having a constant wall gradient, whereby the fiber angle varies as a function of a diameter of the woven braid, wherein the layers are reinforced with carbon fibers in the form of stationary threads arranged in the woven braid arranged at a fiber angle of 0° relative to the rotational axis, filling a mold with the blank, whereby the mold has an inner volume that matches to the carbon fiber-reinforced plastic laminate that is to be produced, production of the carbon fiber-reinforced plastic laminate in an resin transfer molding (RTM) process making use of an epoxy resin or a polyurethane resin as the matrix material that is to be injected, and removal of the cured carbon fiber-reinforced plastic laminate as the hub.

13. The method according to claim 12, wherein the resin transfer molding (RTM) process has a cycle time of the sum of a compression time and a curing time and a time required for refilling of less than 30 minutes.

* * * * *